United States Patent [19]

Altman et al.

[11] 4,032,863

[45] June 28, 1977

[54] METAL VAPOR LASER TUBE

[75] Inventors: Daniel E. Altman; Glidden J. Barstow; Myer Geller, all of San Diego, Calif.

[73] Assignee: The United States of America as represented by the Secretary of the Navy, Washington, D.C.

[22] Filed: Apr. 19, 1976

[21] Appl. No.: 678,264

[52] U.S. Cl. .......................................... 331/94.5 D
[51] Int. Cl.² .......................................... H01S 3/03
[58] Field of Search .................... 331/94.5; 330/4.3

[56] References Cited

UNITED STATES PATENTS

| | | | |
|---|---|---|---|
| 3,614,550 | 10/1971 | Marinace et al. | 331/94.5 D |
| 3,777,282 | 12/1973 | Richards | 331/94.5 D |
| 3,798,486 | 3/1974 | Hernquist | 331/94.5 D |
| 3,851,272 | 11/1974 | Shull et al. | 331/94.5 D |

*Primary Examiner*—William L. Sikes
*Attorney, Agent, or Firm*—R. S. Sciascia; G. J. Rubens; J. W. McLapen

[57] ABSTRACT

An improved metal vapor laser tube is comprised of an enclosure, preferably in an elongate tubular form, containing an amount of a metallic element. The material of the enclosure is selecteed to be electrically non-conductive and also for its ability to withstand elevated temperatures of the order of 1000° C. The enclosure has at least one window capable of transmitting energy at the wavelength of emission of the metallic element contained within it. Two electrodes, preferably in the form of cylinders, are disposed at opposite ends within the enclosure in coaxial alignment with the major axis of the enclosure. An extension from the major axis of the enclosure is disposed proximate to each electrode and an electrical conductor connected to each electrode is sealed within substantially the entire length of each extension. Each electrical conductor is characterized as being of a strip configuration and having a substantially elongate elliptical cross-section.

A method of sealing the metallic conductor strip within a substantially tubular extension member comprises the steps of positioning the metallic strip within the hollow of the tubular member, then inserting a semi-cylindrical piece of fusible material into the hollow portion of the tubular member on each side of the metallic conductor strip, and finally simultaneously fusing the fusible material to both the metallic strip and the tubular member to form a unitary extension assembly.

6 Claims, 4 Drawing Figures

METAL VAPOR LASER TUBE

BACKGROUND OF THE INVENTION

Many metallic vapor laser tubes preferably are maintained at elevated temperatures of the order of 1000° C for certain types of desired operation. Customarily, such laser tubes are enclosed within an oven to maintain the elevated temperature thus causing the metallic element contained within the sealed enclosure of the laser tube to become vaporized. Electrically conductive electrodes sealed within the laser tube generate an arc therebetween in response to the application of a suitable source of electrical energy to the external terminals of the electrodes. The laser tube, thus energized and maintained at a suitable temperature, develops sufficient vapor pressure of the metallic element causing the metal vapor to be raised to an energy level at which it will emit laser energy output.

In the prior art, metal vapor laser tubes customarily included "hot" zones which were generally disposed between the electrodes that generated the electrical discharge. Moreover, the windows conventionally disposed at either end of the laser tube for transmitting the laser energy were usually maintained at a significantly lower temperature which was generally referred to as the "cold" zone. Though these windows may not actually be operated at what is commonly regarded as a cold temperature, they were nonetheless cold relative to the hot zone. As a result, many prior art metallic vapor laser tubes were limited in life and efficiency because of the fact of the metal vapor would migrate to the cold zone on the windows and become deposited upon the windows by a partial condensation, thereby rendering the windows partially opaque to the laser energy emitted so that the laser beam could not be sufficiently transmitted outside the confines of the laser tube.

Additionally, the hot metal in its vaporous form migrated in a continuous particle flow to the cold zone so that eventually there was very little metal remaining in the hot zone where the laser emission takes place. As a result, laser action after some determinative period of time ceased to occur for lack of sufficient vaporized metal in the hot zone resulting in insufficient vapor pressure to support and maintain the desired lasing action.

Many metallic vapor laser tubes of the prior art sought to overcome this problem by introducing an inert buffer gas such as argon, for instance, or helium between the hot zone and the relatively cold zone. As a result, the windows, were desirably isolated from the metallic vapor, thus preventing condensation of the metallic vapor upon the windows and obviating the resultant undesirable diminished efficiency of operation. Although the use of such a buffer gas in prior art metallic vapor laser tubes was an advance and improvement in the art, it still left much to be desired because of several inherent disadvantages which the presence of a buffer gas introduces.

For example, the discharge within the prior art type of tube using buffer gas, was always of a necessity a mixture of buffer gas and the vaporized metal. In certain cases where there was no interchange of energy between the two systems, i.e., the buffer gas and metallic vapor, the buffer gas would absorb considerable energy from the power supply. On the other hand, when there is an energy transfer between the two gas systems which is not essential for pumping energy into the metallic vapor, it is possible that such interaction with the buffer gas can inhibit the desired stimulated emission.

Moreover, even with the advantages which the use of a buffer gas provides in diminishing condensation of the metallic vapor on the cold windows, eventually all the metal may be transposed from the hot zone to the relatively cold zones which are presented by the walls of the laser tube, for example, outside the hot zone. Consequently, after some determinable period of operation the laser tube must be replenished with an additional amount of metal to provide the basis for generating the metallic vapor for the desired stimulated emission in the hot zone.

Accordingly, there is an existing need for an improved metal vapor laser tube which will operate at an elevated temperature without having the so-called hot and cold zones conventionally relied upon in the prior art.

SUMMARY OF THE INVENTION

The elimination of the so-called hot and cold zones necessarily implies that the entire laser tube assembly be maintained at an elevated temperature apart from those extending portions which support electrical conductors for connection to a suitable source of electrical energy to actuate the laser tube to its operative condition of emission. This requirement gives rise to the problem of an adequate seal between the electrically conductive material and that of the laser tube such as quartz, for example, which may be used for the entire assembly including the extensions supporting the electrical conductors. The electrical conductors carrying the current to the electrodes in order to support and maintain the vaporized condition of the metallic element within the enclosure are preferably sealed for the entire length of the extensions from the metallic vapor laser tube assembly providing a gradual gradient of temperature from the main portion of the tube assembly to the terminal provided for electrical connection at the end of each such extension. Such a permanent seal of the electrical conductor within substantially the entire length of each such extension prevents migration of the vaporized metal from the main portion of the metallic vapor laser tube to the relatively cold portion of the tube at the extremities of the extensions from the tube which provide a means of applying a suitable source of electrical energy.

Such seals, which are usually of a metallic-to-quartz glass type, for example, along substantially the entire length of the electrical connector extension from the main enclosure of a metallic vapor laser tube pose a serious problem, however, if they are of conventional form and configuration. Because of the extreme temperature gradient along the connector extension under operating conditions, seals of conventional form and configuration are unable to withstand the internal stresses created in the unitary structure due to the differential between the coefficients of expansion of the two materials sealed together, i.e., metal and quartz glass.

A number of expedients have been developed in order to render a metallic vapor laser tube operable entirely at an elevated temperature except for the extensions provided for connection to a suitable source of electrical energy. One such metallic vapor laser tube employs a conductor disposed along a confined capillary within the extension to minimize the migration of metal vapor away from the hot zone of the tube, as exemplified by U.S. Pat. 3,777,282, issued in the name of William E. Richards on Dec. 4, 1973. Though the concept as disclosed therein represents an improvement in the art, it is not entirely satisfactory from all points of view and the present invention is directed toward a further improvement of metallic vapor laser tubes, particularly those which are operated at a high vapor pressure and accordingly are not adaptable to employ gas buffers.

It has been found that an electrical conductor having a thin strip configuration and a substantially elongate elliptical cross section which virtually tapers to a knife edge at its cross-sectional extremities may be sealed within the entire length of a quartz glass extension from the main enclosure portion of a metal vapor laser tube and yet withstand the stresses which occur due to the temperature gradient from about 1000° C at the principal enclosure portion of the metal vapor laser tube to the relatively cold portion of the tube where the temperature may be of the order of 200° C at the terminals where a suitable source of electrical energy is applied to actuate the metallic vapor laser tube and cause it to emit its desired laser energy.

In accordance with the concept of the present invention, a metallic vapor laser tube assembly comprises an enclosure containing an amount of a metallic element. The enclosure is of an electrically non-conductive material selected for its ability to withstand elevated temperatures of the order of 1000° C or more. Typically such enclosure may be comprised of a high grade quartz material. To facilitate the useful employment of laser energy emitted by the metallic vapor when elevated to its high energy state, at least one window is provided at an end of the enclosure, the window being of a material capable of transmitting energy at the wavelength of laser emission of the metallic energy contained within the enclosure.

Two electrodes are disposed at opposite ends within the enclosure in coaxial alignment with the major axis of the enclosure. If the enclosure portion of the metallic vapor laser tube takes its preferred tubular configuration, the electrodes are preferably of tubular or cylindrical configuration also, and are disposed in coaxial alignment so as to permit the passage of laser energy through the hollow portion of the cylindrical electrodes along the central axis common to both the tubular enclosure structure and the cylindrical electrodes.

An extension from the major axis of the enclosure (usually orthogonally disposed) is provided proximate to each electrode. An electrical conductor is connected to each electrode and sealed within substantially the entire length of each extension. The electrical conductor, in accordance with the concept and teaching of the present invention, is characterized as being of strip configuration, i.e., a ribbon-like form, and also in having a substantially elongate elliptical cross-section. In one preferred embodiment of the present invention the ratio of the width of the ribbon-like strip conductor to its maximum thickness of its elongate elliptical cross section was of the order of 300 to 1. Thus, it may be readily appreciated that the ribbon-like strip conductor sealed within substantially the entire length of each extension from the metal vapor laser tube of the present invention is extremely thin and tapers to a knife-like edge at the extremities of its width.

It has been found that such a configuration of conductor, sealed in a suitable non-conductive material such as high grade quartz, for example, will withstand the stresses created by the temperature gradient developed between one of its ends which is at 1000° C or more, and the other of its ends which is at the relatively cool temperature of 200° C. As will be readily appreciated by those knowledgeable and skilled in the pertinent arts, such an electrical conductor sealed within substantially the entire length of each extension of quartz or similar material completely prevents the migration of metallic vapor from the hot portion of the metallic vapor laser tube of the present invention, to the cooler portion of that metallic vapor laser tube. This highly desirable aspect of the present invention prevents the problems of condensation, vapor migration, energy absorption, etc. as existed in many prior art metallic vapor laser tubes, undesirably diminishing the efficient operation of such prior art metallic vapor laser tubes as well as limiting their useful life.

Accordingly, it is a primary object of the present invention to provide an improved metallic vapor laser tube, which because of its configuration, completely obviates the migration of hot metallic vapor from the hot portion of the tube.

Another important object of the present invention is to provide a metallic vapor laser tube which is capable of operating with hot windows to obviate disadvantages of prior art metallic vapor laser tubes.

Another important object of the present invention is to provide an improved metallic vapor tube which does not require the employment of a buffer gas.

A further most important object of the present invention is to provide a method of sealing a metallic strip within a substantially tubular member so that the resultant structure will withstand extreme temperature gradients.

These and other features, objects, and advantages of the present invention will be better appreciated from an understanding of the operative principles of a preferred embodiment as described hereinafter and as illustrated in the accompanying drawings.

DESCRIPTION OF THE PREFERRED EMBODIMENTS

Figure 1:
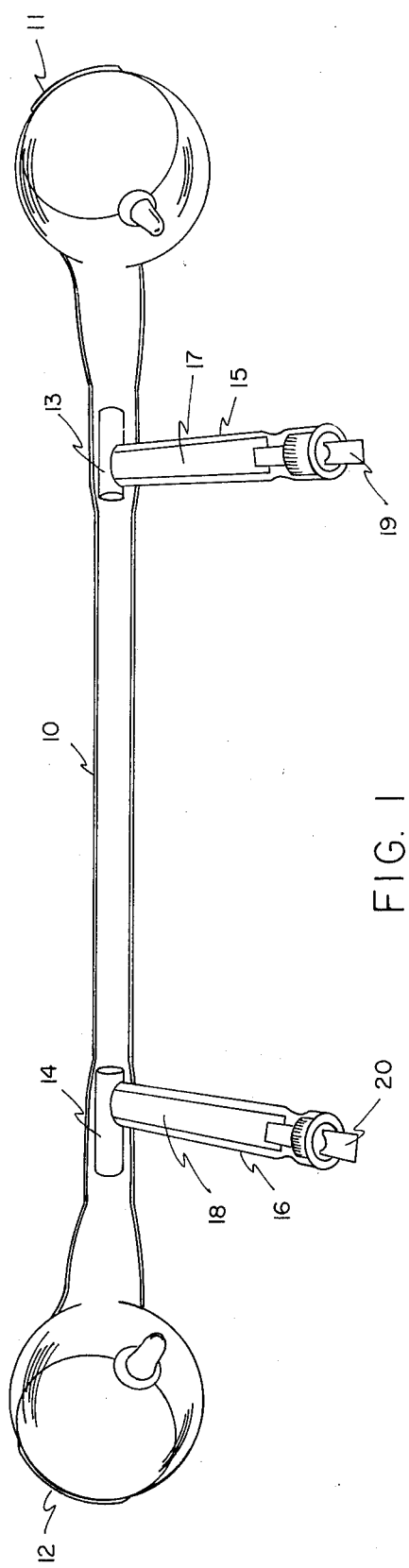
FIG. 1 is an isometric view of a metallic vapor laser tube embodying the present invention.

FIG. 1 illustrates a preferred embodiment of the present invention. An enclosure 10, which may be fabricated of high grade quartz material, for example, contains an amount of a metallic element. The enclosure 10 is fabricated of an electrically non-conductive material selected for its ability to withstand elevated temperatures such as a high grade quartz, for example, and includes at least one window such as those shown at either end 11 and 12 which is capable of transmitting energy at the wavelength of laser emission of the metallic element contained within the enclosure 10.

The main enclosure portion 10 of the metallic vapor laser tube of the present invention may typically be of high grade quartz material and in one embodiment was designed to have a 3mm. inside diameter and an 8mm. outside diameter in a tubular form which was 13cm. long. The windows 11 and 12 were 1¼ inches in diameter secured at Brewster's angle by quartz end bells as illustrated in FIG. 1.

Two electrodes 13 and 14 are disposed at opposite ends within the enclosure in coaxial alignment with the major axis of the tubular shaped enclosure 10. An extension, such as those shown at 15 or 16, is positioned proximate to each electrode 13 and 14, respectively, the extensions being orthogonally disposed relative to the major axis of the enclosure 10.

An electrical conductor, such as those shown at 17 and 18, is connected to each electrode 13 and 14, respectively, the electrical conductor being sealed within substantially the entire length of its respective extension. Thus, the electrical conductor 15 connected to the electrode 13 at one end of the enclosure 10 is sealed within substantially the entire length of the extension 17, while the electrical conductor 16 connected to the electrode 14 at the other end of the enclosure 10 is sealed within substantially the entire length of the extension 18. The extensions 17 and 18 may be of a suitable material such as quartz glass which is sealed to the enclosure 10.

Figure 3:
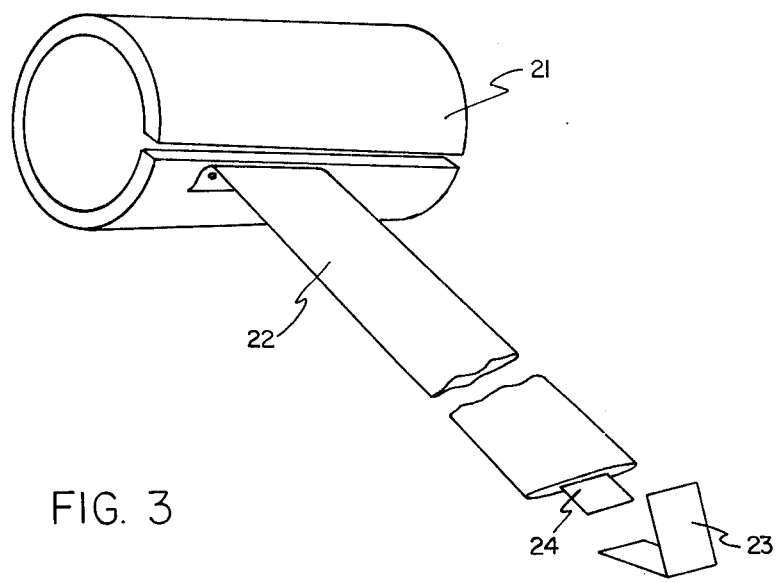
FIG. 3 is an isometric view of an assembly including an electrode, a conductive connector, and terminal employed within the structure of the metallic vapor laser tube illustrated in FIG. 1; and, FIG. 4 illustrates a preferred method of fabrication of an assembly comprising the electrically conductive connector sealed within an extension as illustrated in FIGS. 1 and 2.

The electrical conductors 15 and 16 are of a particular configuration, however, having a substantially elongate elliptical cross-section. Suitable electrically conductive terminals are secured to the ends of the respective electrical conductors 17 and 18 as will be explained more fully in connection with the description of the electrode-conductor assembly as illustrated in FIG. 3.

As will be appreciated by those knowledgeable and skilled in the pertinent arts, the portion of the metallic vapor laser tube assembly which comprises essentially its major axis and includes the enclosure 10 and the electrodes 13 and 14, as well as the Brewster windows 11 and 12, is maintained at an elevated temperature usually of the order of 1000° C.

The terminals 19 and 20 of the outwardly extending electrical connections are operated at the relatively cold temperature of the order of 200° C. Obviously, there is a large temperature gradient from the major portion of the tube itself to the point where a suitable source of electrical energy is connected to the extending terminals 19 and 20.

The concept of the present invention is directed to the particular problem of devising an improved metallic vapor laser tube which will withstand the extreme stresses created by the differences in coefficients of expansion between the metal conductor and the glass over the length of the sealed extensions from the tube.

It is believed that the large differences in coefficient of expansion in the novel structure conceived by the present invention are accommodated by some minute flexing of the quartz along the elliptical edges of the ribbon-like strip electrical conductor in compensating for changes in ribbon thickness which may occur due to the large temperature gradient. In the other two dimensions it is believed that the extremely thin cross-section of the material of the conductors may be deformed by forces generated in the bulk of the quartz within which it is sealed. Though the entire physical reasons for the results are not entirely known, nor have been determined, it is known that the structure as taught by the concept of the present invention provides a reliable vacuum tight seal which is most desirable in this type of metallic vapor laser tube and has not been achieved in the prior art with the same degree of success as is attainable in accordance with the teaching of the present invention.

Figure 2:
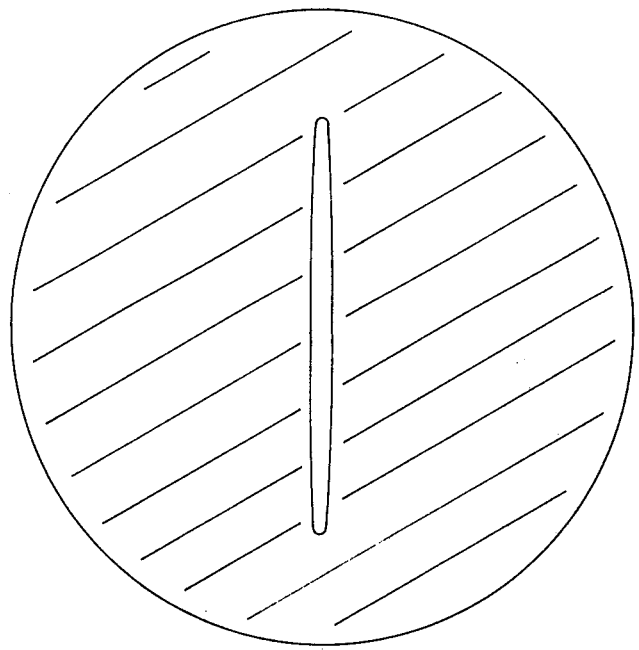
FIG. 2 is a greatly enlarged cross-sectional view of one of the extensions from the metallic vapor laser tube of FIG. 1 which supports an electrically conductive connector for its actuation from a suitable source of electrical energy.

FIG. 2 is a greatly enlarged cross-sectional view of a typical electrical conductor sealed within a quartz extension in accordance with the concept and teaching of the present invention. In one embodiment the elongate elliptical cross-section substantially as illustrated in FIG. 2 had a maximum thickness of about 0.002cm. and a width of approximately 0.635cm.. Molybdenum was found a preferred material for use as the conductor sealed within the quartz, in accordance with the teaching of the present invention.

FIG. 3 illustrates an electrode, an electrical conductor, and terminal assembly in a preferred embodiment of the present invention. The electrode 21 may comprise a single turn of 5 mill tantalum strip as illustrated. Electrode 21 is spot welded to an elliptically cross-sectioned molybdenum strip of ribbon-like configuraton 22. It has been found that tantalum is preferable over molybdenum for the electrodes to avoid the platinum intermediate section necessary when welding molybdenum to molybdenum. It has been found that in specific cases platinum may be incompatible with the metal vapor fill and must therefore be avoided within the metal vapor laser tube assembly.

A terminal connection to the outer end of the electrical conductor 22 is made by means of a folded section 23 of 0.0125cm nickel strip attached by means of a welded 0.0025cm platinum intermediate strip 24.

In fabrication of the metallic vapor laser tube in accordance with the concept and teaching of the present invention, the electrode and the molybdenum ribbon conductor assembly may be wrapped around a suitable mandrel and slipped into the enclosure portion of the unfinished laser tube. The ribbon-like electrical conductor is then unwound and drawn through a section of hollow quartz tubing which has previously been sealed to the main body of the enclosure of the laser tube to function as the outer shell of one of the extensions as illustrated in FIG. 1.

Figure 4:
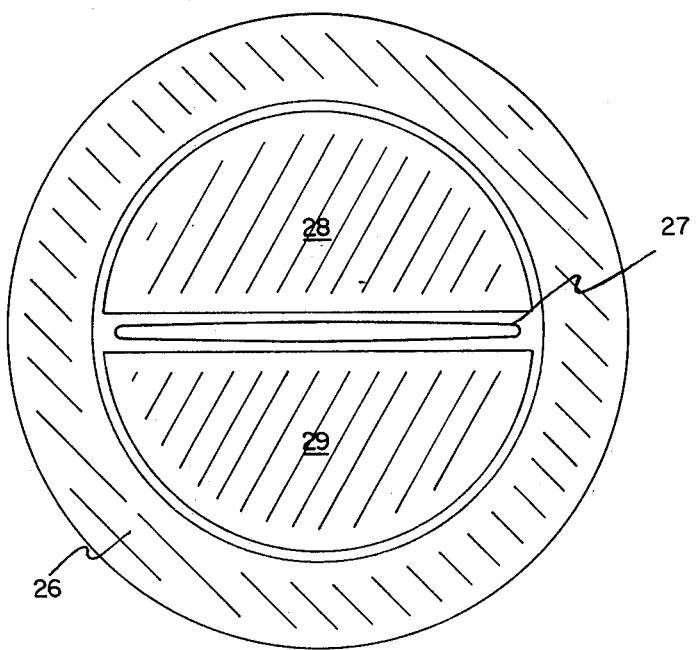

FIG. 4 illustrates the outer tubular section of such an extension 26 with the ribbon-like elongate elliptically cross-section electrical conductor 27 centered within it. The main part of the remaining void within the outer extension tube 26 is then filled by two semi-cylinders 28 and 29 which have been prepared from quartz rod. In the process and method of fabricating the seal for the electrode and electrical conductor assembly of the extensions employed in accordance with the concept of the present invention, the assembly is then evacuated to avoid oxidation of the electrical conductor 27 during the succeeding steps of fusion. Under evacuated conditions the entire length of the extension assembly enclosing the electrical conductor 27 except for a few outer millimeters is then fused. The fusion is begun preferably at the end of the extension nearest the enclosure 10, as shown in FIG. 1, so that any volatiles produced will be driven outside the tube. After the entire seal is completed and cooled, the outer end is sawed off exposing the platinum tab to which the nickel contact strip is then welded. The contact strip may then be anchored in place by filling the outer end of the extension tubing with sauereisen cement.

The entire assemblies of the metallic vapor laser tube of the present invention were baked out at a limiting temperature of the quartz i.e., approximately 1025° C for several hours before the metal was distilled into the enclosure 10. With a clean tube thus produced, no difficulty was experienced in reaching an indicated pressure of $10^{-7}$ to $10^{-8}$ torr. During the bake-out process and actual operation it is highly desirable that the outer inch or so of the extensions be kept below about approximately 200° C to avoid excess oxidation of the outer semi-exposed end of the molybenum electrical conductors. However, since these outer portions of the tube extensions are normally outside the oven which is employed to keep the main part of the assembly at its usual operating temperature of approximately 1000° C, keeping the extremities of the extensions relatively cool presents no problem.

Thus, it will be readily appreciated by those skilled in the pertinent arts that the concept of the present invention provides a novel structure and a method for fabricating a particular type of seal for sealing suitable materials such as quartz to molybdenum which comprise extensions from the main operative portion of the metallic vapor laser tube providing for electrical connection and its actuation and energization.

The new method and structure of the present invention provide a vacuum tight seal which will withstand the extreme gradient in temperature which creates extraordinary stresses due to differences of temperature coefficients of expansion of the two different materials sealed throughout the length of extensions from the hot part of such a metal vapor laser tube to what is known as its cold portion.

Obviously many modifications and variations of the present invention are possible in the light of the above teachings. It is therefore to be understood that within the scope of the appended claims the invention may be practiced otherwise than as specifically described.

What is claimed is:

1. A metal vapor laser tube comprising:
   an enclosure having an elongate major axis and containing an amount of a metallic element,
   said enclosure being of an electrically non-conductive material selected for its ability to withstand elevated temperatures and having at least one window aligned with said major axis and capable of transmitting energy at the wavelength of laser emission of said metallic element;
   two electrodes disposed at opposite ends within said enclosure in coaxial alignment with said major axis of said enclosure;
   an extension proximate to each electrode and orthogonally disposed relative to said major axis of said enclosure;
   an electrical conductor connected to each electrode and sealed within substantially the entire length of each extension,
   said electrical conductor being of strip configuration and having a substantially elongate elliptical cross-section; and
   a terminal connected to each said electrical conductor and extending from the external sealed end of each extension for connection to a source of electrical energy.

2. A metal vapor laser tube as claimed in claim 1 wherein said enclosure is tubular in shape.

3. A metal vapor laser tube as claimed in claim 2 and including an optically flat window sealed to each end of said enclosure.

4. A metal vapor laser tube as claimed in claim 3 wherein said electrodes are cylindrically shaped.

5. A metal vapor laser tube as claimed in claim 1 wherein the ratio of the width of said conductor to the maximum thickness of its said elongate elliptical cross-section is greater than 100 to 1.

6. A metal vapor laser tube as claimed in claim 1 wherein said electrical conductor connected to each electrode is comprised of molybdenum material having an elongate elliptical cross-section.

* * * * *